(12) United States Patent
Schloss

(10) Patent No.: US 6,613,238 B2
(45) Date of Patent: Sep. 2, 2003

(54) FIXED MEDIA FILTER SCREEN, SCREEN PROTECTOR, AND CSO SCREEN

(76) Inventor: Charles M. Schloss, 10555 E. Dartmouth Ave., Suite 230, Aurora, CO (US) 80014

( * ) Notice: Subject to any disclaimer, the term of this patent is extended or adjusted under 35 U.S.C. 154(b) by 0 days.

(21) Appl. No.: 10/114,931

(22) Filed: Apr. 2, 2002

(65) Prior Publication Data

US 2002/0190010 A1 Dec. 19, 2002

Related U.S. Application Data

(63) Continuation of application No. 09/697,665, filed on Oct. 25, 2000, now abandoned.

(51) Int. Cl.[7] .............................................. E02C 5/08
(52) U.S. Cl. .................. 210/791; 210/154; 210/159; 210/162; 210/407; 210/408; 210/413
(58) Field of Search ................... 210/791, 153, 210/154, 156, 157, 159, 162, 407, 408, 413

(56) References Cited

U.S. PATENT DOCUMENTS 4,277,339 A * 7/1981 Quin .......................... 210/159

* cited by examiner

*Primary Examiner*—Robert Popovics
(74) *Attorney, Agent, or Firm*—Gibson, Dunn & Crutcher LLP

(57) ABSTRACT

The present invention is a device and method for clearing debris from fluid channels. In one embodiment, the device has a fixed screening member that is permeable in part wherein debris will collect. A movable scraper then scrapes along the screen and removes the debris therefrom and transports the debris to a desired location. In embodiments of the invention, the surface that comprises the screening member may be arcuate, and may be a surface of revolution. Different portions of the screening member may or may not be permeable. The invention may also include an overflow mechanism where overflow water is diverted into a separate unscreened fluid stream. Further, the invention may be suitable for use within a sump.

5 Claims, 2 Drawing Sheets

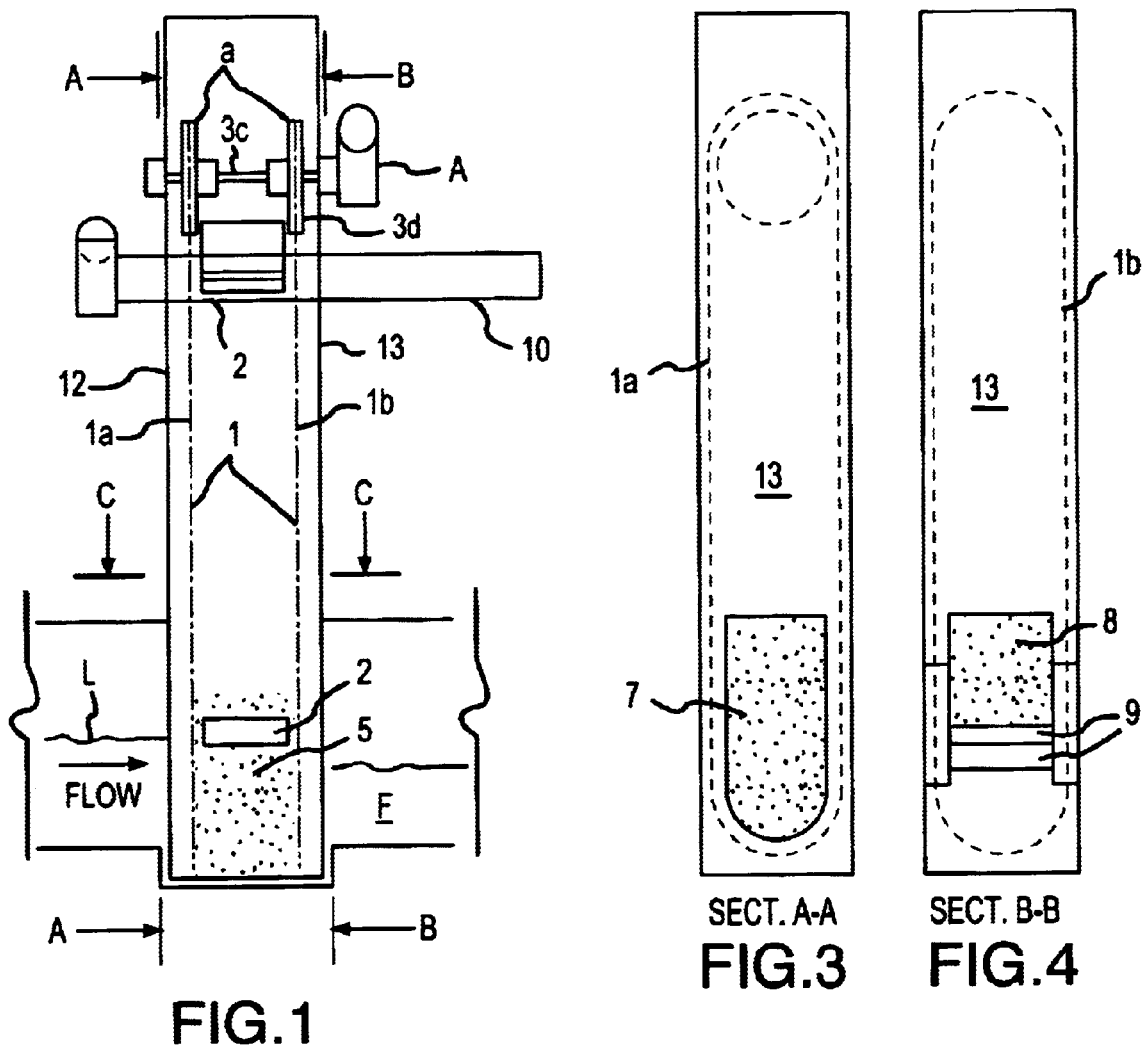
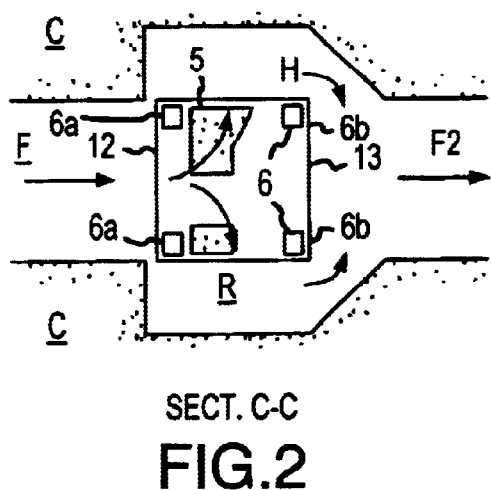

FIXED MEDIA FILTER SCREEN, SCREEN PROTECTOR, AND CSO SCREEN

This is a continuation of patent application Ser. No. 09/697,665, filed on Oct. 25, 2000, now abandoned. That application is incorporated in its entirety by reference.

FIELD OF THE INVENTION

The present invention relates to screening equipment such is used in connection with water treatment plants and wastewater treatment facilities. The general purpose of such screening equipment is to remove solids from the fluid stream so that the solids may be processed separately from the fluid stream.

DESCRIPTION OF RELATED ART

A typical water or waste water treatment plant includes some means to screen solids from the fluid flowing into a treatment facility; this is often the first stage of treatment. For example, it is often important to catch and remove rocks, paper, cotton, cloth, or other debris from a fluid stream to protect downstream processing equipment. For another example, solids may be separated from a diversion water stream (CSO screening), wherein the solids are returned to the stream for subsequent treatment, allowing the excess liquid of a storm to by-pass sewage treatment works or to flow to storage for subsequent treatment.

Certain types of solids cause particular problems for fluid screening equipment. In particular, the widespread use of non-soluble, not readily biodegradable plastic tampon applicators is now causing significant visual and physical problems in conventional sewage treatment plants. The screening mechanisms widely used in the later half of the twentieth century were not intended for removing ½" inch diameter and smaller solids, and consequently these solids are now reporting in filters, digesters, and even in plant discharges to receiving streams, lakes, and oceans. Depending on the type of equipment used, this causes obvious problems for the operation of the screening equipment, environmental problems, or both.

Rocks and gravel sometimes cause extreme difficulties for bar screens and screenings compactors. There is a present need for a device to remove these materials prior to screening.

A number of machines have been developed in recent years for the general purpose of removing solids from a fluid stream. Representative machines are disclosed in U.S. Pat. Nos. 4,188,294; 3,856,678; and 3,615,022 of Hagihara (plastic element filter screens); U.S. Pat. No. 1,207,376 of Davidson; U.S. Pat. No. 4,812,231 of Wiesemann (metal element screen); Link Belt traveling water screens of about 1956 or 57; and U.S. Pat. No. 2,929,504 of Lind et al. (screw screens).

Each of the above designs has certain inherent weaknesses which causes the design to be sub-optimal. For example, the plastic filter element of Hagihara has a high mortality rate and is difficult and time consuming to replace; and the filter screens derived from Wiesemann are reportedly high maintenance. Both types of screens require either pivotable or removable mountings to remove the screenings that become trapped between the down-going and up-going sections of the filtering chain conveyer. For another example, traveling water screens have tray cleaning problems associated with the fine openings of the trays, and also have sealing problems at the moving joints. For yet another example, screw screen designs impose severe lay-out constraints. Finally, the rack of spaced parallel bars that are cleaned by a rake are problematic when used with very small openings because the relatively narrow cleaning teeth, which must be narrower then the bar spacings, are weak and readily damaged.

The above efforts in the development of screening devices, and the problems that have not been solved, show that a simple, reliable, and economical screening mechanism would be a welcome advance in the art.

SUMMARY

The present invention is a device and method for clearing debris from fluid channels. In one embodiment, the device is a screening member that is permeable in part wherein debris will collect. A movable scraper then scrapes along the screen and removes the debris therefrom and transports the debris to a desired location. An embodiment of the invention, the surface that comprises the screen member, may be arcuate, and may be a surface of revolution. Different portions of the screening number may or may not be permeable. The invention may also include an overflow mechanism where overflow water is diverted into a separate unscreened fluid stream. Further, the invention may be suitable for use within a sump.

BRIEF DESCRIPTION OF THE DRAWINGS

FIG. 1 is a side elevation view of an embodiment of the present invention, shown in a typical operating environment.

FIG. 2 is plan view of an embodiment of the present invention, taken along the section C—C of FIG. 1.

FIG. 3 is an upstream elevation view of an embodiment of the invention, taken along the section A—A of FIG. 1.

FIG. 4 is a downstream elevation view of an embodiment of the invention, taken along the section B—B of FIG. 1.

DETAILED DESCRIPTION

Figure 5:
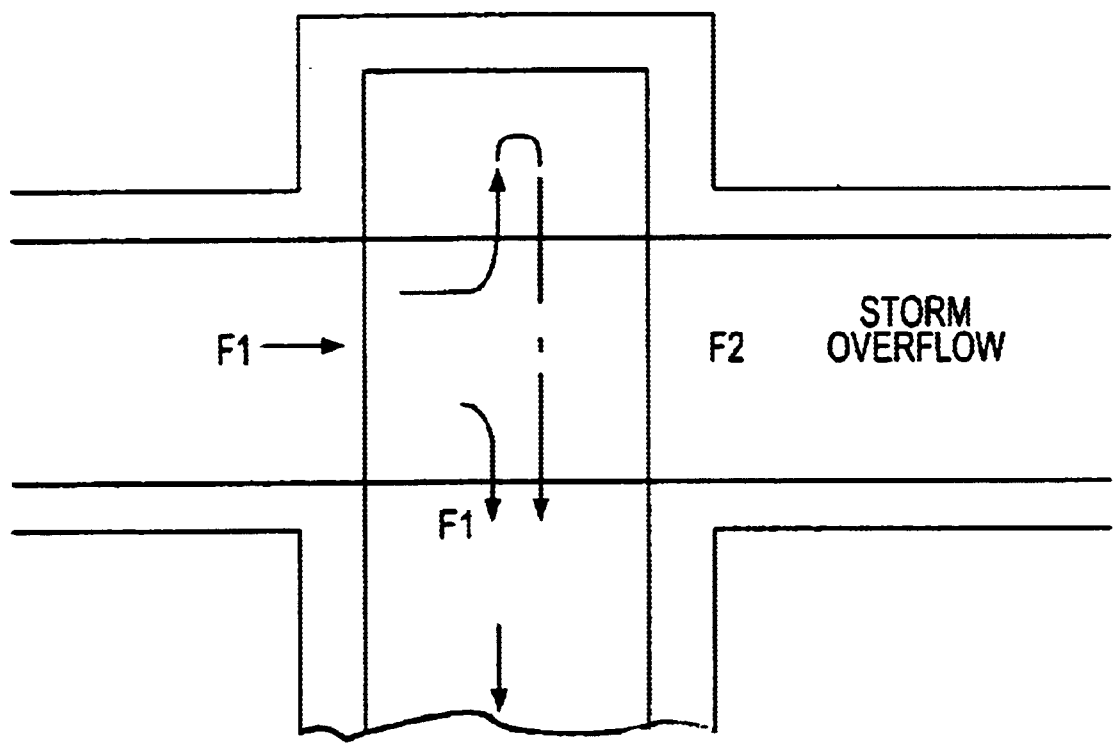
FIG. 5 is a plan view of another embodiment of the invention, illustrating use in a storm overflow design.

A device according to an embodiment of the present invention is shown in side elevation in FIG. 1. The device is situated in a fluid stream F constrained within a channel (the channel is bounded by boundary C such as concrete defining the channel as shown in FIG. 2). The fluid stream F has a flow direction as indicated by the flow arrow. The device includes a moveable pair of chains 1 (further described as 1a and 1b) that revolve around the perimeter of the fluid stream F, from a point substantially near the bottom of the fluid stream F to a point above a top level L of the fluid stream. It will be understood that the chains 1 are simply representative of a moving means and could be replaced by a single chain, a belt, or any other moving member which is capable of moving within and above the fluid stream F.

The chains 1 are retained by chain guides 6 (see FIG. 2). In more detail, the chains 1 comprise front chain 1a and rear chain 1b (see FIG. 1), which are respectively retained by front chain guides 6a and rear chain guides 6b. The chain guides 6 can be any means capable of constraining the movement of the chains along their desired path, while still allowing the chains 1 to move as intended. Of course, if the chains 1 were replaced by a single chain, a belt, or other moving member, the chain guides 6 would be replaced with another suitable guiding components. As used above, "front" corresponds to upstream and "rear" corresponds to "downstream."

One or more scrapers 2 are attached to chains 1 and move along with the movement of chains 1. The scrapers may be a rigid scraper blade, brush, bucket, or any other component suitable for attachment to chains 1 and for engaging and moving solid debris. As shown in FIG. 1, two scrapers 2 are attached to the chains 1 but it will be understood that more or fewer may be used. As explained more below, the purpose of the scrapers are to engage and move solids from the fluid stream F to another location.

The device includes a fixed media filter screen 5. By fixed, it is meant that the screen 5 is stationary in the fluid stream F once it has been installed. The screen 5 is permeable, and, for example, may be made of wedge wire screen, perforated metallic or non-metallic sheet, or woven membrane. The screen 5 has clear spacings of a certain preselected size designed to filter out debris of a certain size. The perforations have a cross sectional area that may be circular, rectangular, slotted, or otherwise shaped. The perforations have a cross section that has a maximum length and width that may be equal (such as a circle or square) or may vary by some multiple such as by a factor of, for example, fifteen, in the case of slotted perforations. The number fifteen is only exemplary and not a maximum. As used herein, a perforated screen is distinguishable from a bar screen, which has spacing that are vastly longer in one direction (parallel to the bars) than in the other (perpendicular to the bars). The screen may have a number of different shapes, but in an example and presently preferred embodiment the screen 5 is generally U shaped with the bottom portion of the U being adjacent the bottom of the fluid stream F and the extending sides of the U extending upward along the sides of the fluid stream F. The extending portion of one of the sides of the screen 5 is shown in the view of FIG. 1, and the bottom of the screen 5 is shown in the plan view of FIG. 2. The precise height of the screen 5 is not critical, but the height of the screen is preferably above the expected maximum height (L) of the fluid stream F, as is shown in FIG. 1.

As alternative embodiments, screen 5 could be other than U shaped. For example, the permeable surface could be any section of a surface of revolution. Or, the permeable surface could be a planar extension of a lower surface of revolution. As well as being capable of being constructed of numerous shapes, the screen 5 is not limited to any particular arrangements of permeable surface and non-permeable surface. While the primary purpose of the screen 5 is to serve as a screening element, that purpose can be achieved with a number of different screen shapes.

An upstream view looking into the device is shown in FIG. 3. A front plate 12 generally encloses a major portion of the screening mechanism. The size and shape of the front plate 12 is designed to correspond to the dimension of the fluid stream F at the location that the fluid stream F contacts the plate 12. The plate 12 has an aperture 7 to admit fluid from fluid stream F into proximity with the screen 5. The exact size and shape of the aperture 7 is not critical, but the size and shape of the aperture 7 is such that the admitted fluid will be into the interior of the screen 5. Stated another way, the admitted fluid will be at least partially bounded by the bottom and sides of U shaped screen 5.

A downstream view looking into the device is shown in FIG. 4. A fluid impermeable rear plate 13 generally comprises the rear of the device, primarily blocking the fluid stream F. The rear plate 13 has an aperture 8, however in normal intended operation the aperture 8 is above the expected fluid flow level L so that fluid will not pass through the aperture 8. Instead, the aperture 8 is positioned above level L, and serves as a heavy flow bypass, as described in more detail below.

It will now be appreciated that the front plate 12, rear plate 13, and screen 5 define a volume into which the flow F is directed. Since the front and rear plates are fluid impermeable, the fluid flow F is directed through the screen 5. The screen 5 thus serves as a filter for the fluid flow F, and filters out solids that have a cross section greater than the size of the clear spacings in the screen 5.

The filtered solids are removed from the screen 5 by the scrapers 2. As shown in FIGS. 1 and 3, the chains 1 and scrapers 2 are located with respect to the screen 5 so that as the chains 1 move, the scrapers 2 will scrape along the interior of the screen 5 and will engage and carry the filtered solids. The scrapers 2 move in a path having a high point and a low point. The movement of the scrapers is arcuate in the vicinity of the high point and low point and is substantially vertical between the vicinity of the high point and the low point. In the exemplary embodiment, the arcuate path is caused by sprockets 3 at the high point and similar sprocket at the low point. In between the sprocket, the movement is vertical. This arrangement allows for embodiments of the invention to be easily used in relatively deep channels or channels having deep flows, which would be substantially more difficult with prior art devices such as drum conveyers.

In the illustrated embodiment, the scrapers 2 discharge into a conveyer 10 that removes and conveys the filtered solids from the scrapers 2 to a desired location. As the conveyer 10 can include any of a number of type of devices such as wiper blades that are intended to remove and transport solids from a scraper, it need not be described in detail and is shown schematically. Examples of cleaning implements to clean the scrapers 2 include without limitation any blade or blades, brush or brushes, or the force of spraying water or other liquids or gases. The conveyer 10 can convey the filtered solids to any convenient point of disposal such as via a discharge chute or a compactor.

The chains 1 of the illustrated embodiment are supported by sprockets 3, the sprockets being further designated as 3a and 3b. In particular, chain 1a is supported by sprocket 3a and chain 1b is supported by sprocket 3b, both of which are attached to rotating shaft 3c, which is supported by adjustable bearings 3d. The rotating shaft 3c is rotated by a motorized device 4, which is conventional. It will be appreciated that sprockets 3 and related drive components are merely one means of moving the chains 1, and the present invention includes any other means to move the chains 1. It will further be appreciated that if alternatives to the chains 1 are used such as a single chain or a belt, corresponding drive means may be included instead of or in addition to the above described drive system. Moving one or more chains or belts generally as described in connection with the present invention is well understood and the present invention includes all drive means.

The fluid flow F directed through the screen 5 enters a relief channel R. As shown in FIG. 2, the relief channel is positioned below and to the sides of the screen 5, so that fluid can drain through the bottom and the sides of the U shaped screen 5. The fluid flow can then be redirected into a channel to form fluid stream F2. It will be understood that while relief channel as described above allows drainage through the sides and the bottom of the filter screen 5, other embodiments of the invention could provide for drainage either only through the bottom or only through the sides of the screen 5.

The heavy flow bypass feature is now described in more detail. The aperture 8 is adjustable by adding or subtracting one or more weir bars 9 that engage the rear plate 13. Adding weir bars 9 raises the opening height of the aperture 8, so that a greater fluid flow level L will be required to cause any portion of the fluid to flow through the aperture 8. It may be desirable to adjust the aperture 8 depending upon the conditions of the treatment equipment being used with the device, or for other reasons. Other embodiments of the invention could provide for adjustability of the aperture 8 by other means, such as gate that can be raised or lowered.

Another aspect of the invention is described in connection with FIG. 5, which is a plan view comparable to FIG. 2. In the embodiment illustrated in FIG. 5, the fluid flow F is split into fluid flows F1 and F2. Fluid flow F1 is formed of the fluid that flows through screen 5. This fluid flow will be screened of solids, and represents the "normal" discharge of the device. Fluid flow F2 is formed of fluid that flows through aperture 8. This fluid is not screened of solids, and represents fluid such as storm overflow that exceeds the normal operating volume of the device. The fluid flow F2 could lead to a retention pond or other suitable overflow reservoir.

Figure 6:
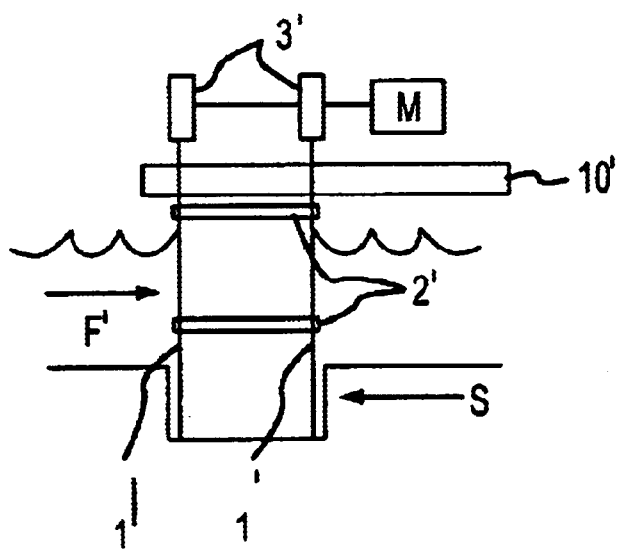
FIG. 6 is a side elevation view of another embodiment of the present invention, shown recessed in a sump in an operating environment.

Another aspect of the invention is shown in FIG. 6. Components similar to those described above are denoted with a ' for ease of reference. A fluid flow F' such as that contained within a pipe or channel has a sump S which is a recessed space below the adjacent floor of the pipe or channel. Thus, heavy debris such as rocks or other heavy solids will tend to settle in the sump S. The sump S is cleaned by one or more scrapers 2'. The scrapers 2' are reciprocated between the sump S and a higher elevation by chains 1', which are turn driven by motor M driven sprockets 3'.

It will be clear that the while a presently preferred embodiment has been described, other embodiments may also be used that will still fall within the scope of the claims. Preferably, the axis of a device according to the invention is aligned parallel to the flow line vector (as shown in the figures), the invention also contemplates other alignments. Further a number of such devices may be used together in order to provide sufficient hydraulic capacity.

What is claimed is:

1. A method for filtering debris from a fluid stream having a primary direction of flow, comprising the steps of:

placing a screening member for accumulating debris flowing within fluid stream, the screening member having a perforated surface section that is permeable at least in part, wherein the screening member is fixed with respect to the fluid stream and the screening member has an axis parallel to the direction of flow;

scraping debris from the screening member with a scraper, said scraper being moved along the screening member in a path having a high point and a low point, the movement of the scraper being arcuate in the vicinity of the high point and low point and being substantially vertical between the vicinity of the high point and the low point.

2. The device of claim 1, wherein the screening member has a surface section that is arcuate.

3. The device of claim 2, wherein at least a portion of the surface section that is arcuate is a surface of revolution.

4. The device of claim 1, further comprising the step of cleaning debris from the scraper selected from the group consisting of hydraulic means and pneumatic means.

5. The device of claim 1, wherein the scraping step uses a plurality of scrapers.

* * * * *